Patented Aug. 29, 1944

2,356,949

UNITED STATES PATENT OFFICE 2,356,949

METHODS OF PREPARING SULPHANILYLAL-KYLISOUREAS

Richard Owen Roblin, Jr., Old Greenwich, and George Washington Anderson, Stamford, Conn., assignors to American Cyanamid Company, New York, N. Y., a corporation of Maine No Drawing. Application January 31, 1942, Serial No. 429,134

5 Claims. (Cl. 260—397.7)

This invention relates to a new and improved process for producing p-aminobenzenesulphonylalkylisoureas.

The compounds which can be prepared by the process of the present invention have the following general formula:

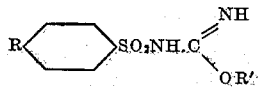

in which R is amino or nitro and R' is an alkyl group.

According to the present invention we have found that these compounds can be readily prepared by the reaction of salts of nitro or acylbenzenesulphonyl cyanamides with alcohols in the presence of a condensing agent such as for example hydrogen chloride. The salts may be of any metal sufficiently strong to form cyanamide salts but as the nature of the metal does not materially affect the reaction it is preferred to use the sodium or calcium salts as these are the cheapest. However, the same results are obtainable with the corresponding potassium salts.

In the modification of the present invention starting with the acylsulphanilyl cyanamide salt the acyl group is not particularly important. Any of the ordinary acyl groups such as acetyl, propionyl, benzoyl and the like may be used. Since however, the acetyl group is not hydrolyzed and therefore does not affect the chemical structure of the final product, it is preferable to utilize the cheapest and most readily available acyl group, namely the acetyl group.

The nitrobenzenesulphonylisoureas may then be transformed into the corresponding p-amino compounds by reduction. The technique of reduction is similar to that employed in the production of other aminobenzenesulphonamide compounds and it is an advantage that the present invention requires no new technique in this step.

The alkyl group of the isourea depends of course, on the alcohol used in the reaction and in general any of the common reacted alcohols may be used such as lower paraffin or other aliphatic alcohols, benzyl alcohol and the like.

The present invention is not concerned with any particular method of preparing the raw materials entering into the reaction and the sodium nitrobenzene cyanamide may for example, be prepared as described in our Patent No. 2,259,721 of October 21, 1941. The acylsulphanilylcyanamide may be prepared by reacting the corresponding acylsulphanilyl chloride with calcium cyanamide.

The invention will be described in greater detail in conjunction with the following specific examples which illustrate the production of typical isoureas. The parts are by weight.

Example 1 p-Nitrobenzenesulphonylmethylisourea

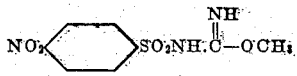

14.9 parts of sodium p-nitrobenzenesulphonylcyanamide were added to 100 parts of methanol and 8 parts of hydrogen chloride were bubbled in; a white precipitate formed. After standing at room temperature in a stoppered flask for one and one-half hours, the solid was filtered off, slurried with water made slightly alkaline with ammonium hydroxide, re-filtered and washed. Recrystallization from methanol gave colorless crystals having a melting point of about 203–6° C.

Example 2

Sulphanilylmethylisourea

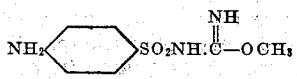

5.3 parts of p-nitrobenzenesulphonylmethylisourea were added to a warmed mixture of 14.5 parts of iron powder and 28 parts of 5% acetic acid. The mixture was heated on a steam bath for one-half hour, cooled and extracted with two portions of 10% sodium hydroxide, each of 40 parts. Neutralization of the extracts with hydrochloric acid (the product was soluble in an excess of acid) gave a precipitate. Recrystallization from water and from isopropyl alcohol, using decolorizing carbon yielded pure sulphanilylmethylisourea having a melting point of about 172–173° C.

Example 3

Sulphanilylmethylisourea

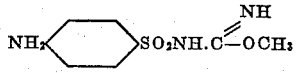

Sulphanilylmethylisourea may also be obtained by passing 8 parts of hydrogenchloride into a mixture of 100 parts of methanol and 26 parts of calcium acetylsulphanilylcyanamide

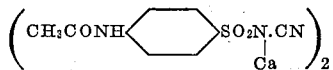

The resulting mixture was allowed to stand 4 hours, then filtered after dilution with an equal volume of water. Upon making slightly alkaline with ammonium hydroxide, a precipitate of sulphanilylmethylisourea formed.

Example 4 p-Nitrobenzenesulphonylethylisourea

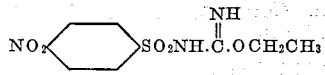

14.9 parts of sodium p-nitrobenzenesulphonylcyanamide were added to 148 parts of absolute ethyl alcohol and 8 parts of hydrogen chloride were passed in. After three hours' standing, the precipitated product was filtered off, washed with alcohol and water and recrystallized from alcohol.

Example 5

Sulphanilylethylisourea

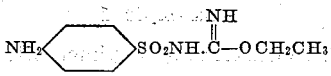

12.5 parts of p-nitrobenzenesulphonylethylisourea were added to a warm mixture of 38.5 parts of iron dust and 88 parts of 5% acetic acid. After heating on the steam bath for half an hour, the mixture was extracted with 10% sodium hydroxide. Neutralization of the extracts with hydrochloric acid yielded a precipitate of sulphanilylethylisourea which was purified by recrystallization from dilute alcohol or from benzene-isopropyl acohol. Its melting point was about 127–8° C.

Example 6 p-nitrobenzenesulphonylisopropylisourea

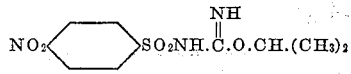

12.5 parts of sodium p-nitrobenzenesulphonylcyanamide were added to 20 parts of isopropyl alcohol plus 40 parts of dioxane. 5.5 parts of hydrogen chloride were passed in rapidly without cooling; the temperature rose to about 58° C. The mixture was allowed to stand at room temperature overnight. After filtering from some solid and solution with water, the solution was made slightly alkaline with ammonium hydroxide. Chilling gave a precipitate which is filtered off; more was obtained by partial evaporation of the filtrate under vacuum. Recrystallization from dilute alcohol resulted in colorless crystals of melting point about 113–114° C.

Example 7

Sulphanilylisopropylisourea

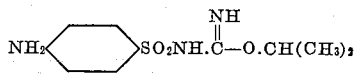

1.7 parts of the nitro compound from Example 6 were added to 3.3 parts of iron dust and 7.2 parts of 5% acetic acid. The mixture was evaporated to dryness on the steam bath and the residues were extracted with 10% sodium hydroxide. On neutralization with hydrochloric acid, a precipitate of sulphanilylisopropylisourea was obtained. Purification by recrystallization from dilute methanol, using decolorizing carbon, and from benzene yielded colorless crystals having a melting point of about 104–5° C.

We claim:

1. A method of producing a sulphanilylisourea having the following formula:

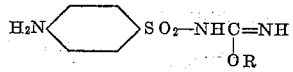

in which R is a hydrocarbon radical which comprises reacting a salt of an acylsulphanilylcyanamide with an alcohol in the presence of a hydrogen halide.

2. A method of producing sulphanilylisourea having the following formula:

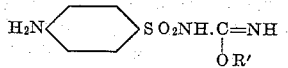

in which R' is an alkyl group, which comprises reacting a salt of an acylsulphanilylcyanamide with a paraffin alcohol in the presence of a hydrogen halide.

3. A method of preparing sulphanilylmethylisourea which comprises reacting a salt of an acylsulphanilylcyanamide with methanol in the presence of hydrogen chloride.

4. A method preparing sulphanilylethylisourea which comprises reacting a salt of an acylsulphanilylcyanamide with ethanol in the presence of hyrogen chloride.

5. A method of preparing sulphanilylisopropylisourea which comprises reacting a salt of an acylsulphanilylcyanamide with isopropanol in the presence of hydrogen chloride.

RICHARD OWEN ROBLIN, Jr.
GEORGE WASHINGTON ANDERSON

CERTIFICATE OF CORRECTION.

Patent No. 2,356,949. August 29, 1944.

RICHARD OWEN ROBLIN, JR., ET AL.

It is hereby certified that error appears in the printed specification of the above numbered patent requiring correction as follows: Page 2, first column, line 48, strike out "ide. Chilling gave a precipitate which is filtered" and insert the same after "hydrox-" in line 57; and that the said Letters Patent should be read with this correction therein that the same may conform to the record of the case in the Patent Office.

Signed and sealed this 14th day of November, A. D. 1944.

Leslie Frazer

(Seal) Acting Commissioner of Patents.